July 3, 1928.
S. B. WRIGHT
1,675,441
MEANS FOR MEASURING BALANCE OF ELECTRICAL NETWORKS
Original Filed Feb. 26, 1927
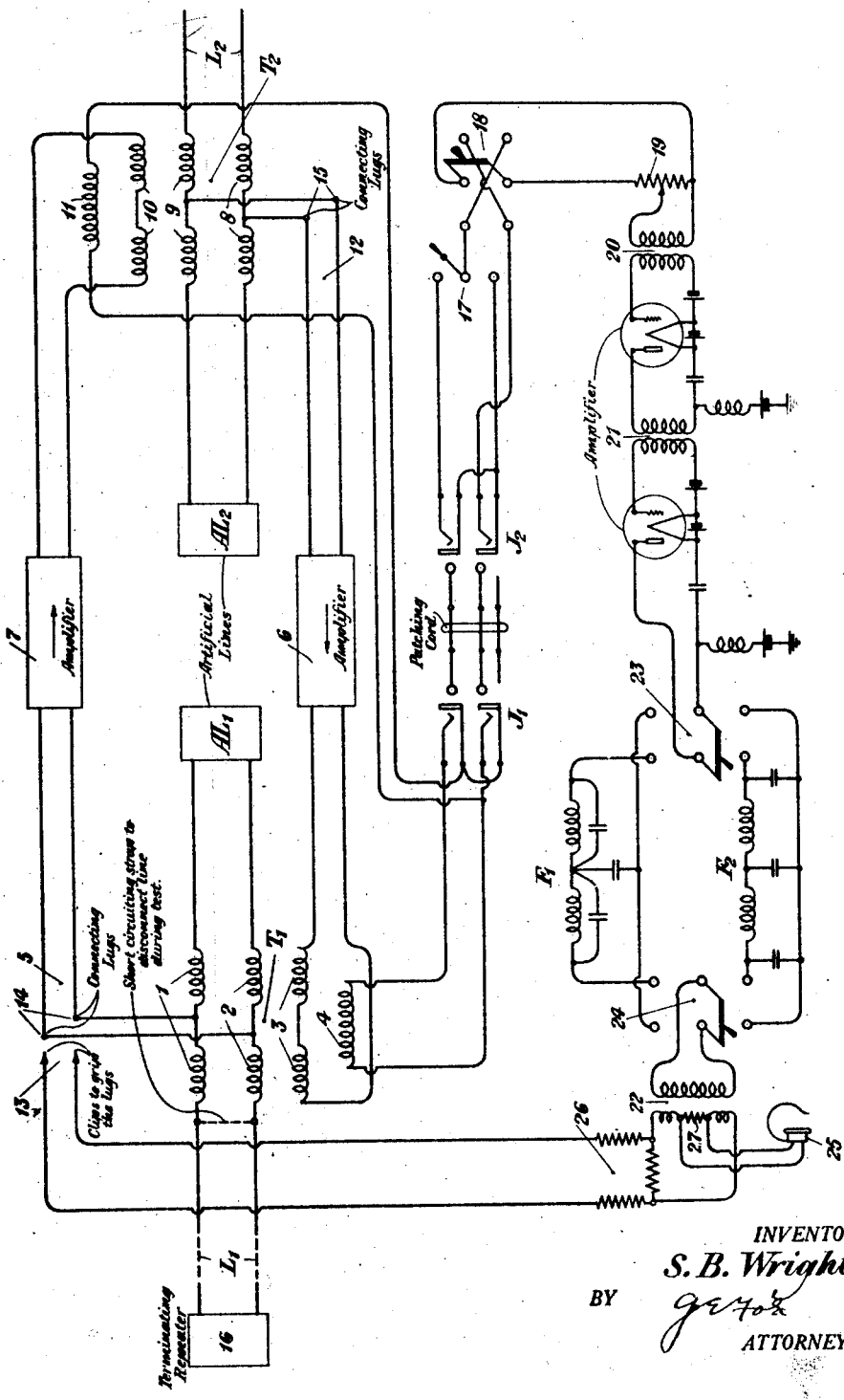
INVENTOR.
S. B. Wright
BY
ATTORNEY Patented July 3, 1928.

1,675,441

UNITED STATES PATENT OFFICE.

SUMNER B. WRIGHT, OF SOUTH ORANGE, NEW JERSEY, ASSIGNOR TO AMERICAN TELEPHONE AND TELEGRAPH COMPANY, A CORPORATION OF NEW YORK.

MEANS FOR MEASURING BALANCE OF ELECTRICAL NETWORKS.

Application filed February 26, 1927, Serial No. 171,336. Renewed September 27, 1927.

This invention relates to means for measuring the degree of balance between electrical networks, and particularly to means for measuring the balance between a transmission circuit and an artificial line intended to balance the said circuit at a repeater.

In the measurement of the degree of balance existing between a transmission circuit and an artificial line intended to balance the said circuit at a repeater, it has been the practice heretofore in the two-way two-element type of repeater to effectively disconnect one of the hybrid coils (or three winding transformers) at the repeater, and to connect the output of the amplifier in one of the one-way circuits of the repeater with the input of the amplifier in the other one-way circuit of the said repeater. Such an arrangement constitutes a two-way one-element repeater between one of the transmission circuits and its balancing network. With such an arrangement the potentiometer of the input of one or both of the amplifiers is varied until the circuit starts to sing, which condition will be indicated by a telephone receiver connected across the output of the repeaters. This singing condition indicates that the gain produced by the amplifier is slightly greater than the loss through the hybrid coil, which loss is a measure of the unbalance existing between the transmission circuit and the artificial line intended to balance that circuit. The magnitude of the gain (and therefore of the loss) is indicated by the calibration of the potentiometer. In order to be able to strap out one of the hybrid coils to arrange the so-called 22-type repeater as a 21-type, it has been the practice heretofore to employ jacks in the main transmission circuit of the repeater, the said circuit being normally completed through the contacts of the jacks. The strapping out of a hybrid coil is then effected by inserting twin plugs in the jacks, which opens up the main transmission circuit and, as stated above, connects the output of one amplifier with the input of the other. It is undesirable, from the standpoint of transmission maintenance, to have in the main transmission circuit a large number of jacks through the contacts of which the speech or other signaling currents must pass. There has recently been designed a hybrid coil which, in addition to the three windings which normally characterize such coils of the prior art, possesses a fourth winding inductively related to the other windings, the object of which is to furnish an inductive connection with the main transmission circuits for the purpose of monitoring or supervising the circuit.

This invention resides in means for measuring the degree of balance between a transmission line and its associated artificial line which makes use of the fourth windings of the hybrid coils at repeaters, thus eliminating the need for jacks in the main transmission circuits.

Other objects of this invention will be apparent from the following description when read in connection with the attached drawing showing schematically a form of the invention. In the drawing $L_1$ represents a section of a transmission circuit and $L_2$ another section, which sections are connected through the two-way two-element type of repeater. The connection between the line and the repeater is effected by means of the hybrid coils or multi-winding transformers $T_1$ and $T_2$ interposed between the repeater and the lines $L_1$ and $L_2$ respectively. Each of the hybrid coils comprises two line-windings, a third winding connected with one of the amplifiers, and a fourth winding connected with jacks for the purpose of monitoring or other supervision. Thus in the coil $T_1$ the windings 1 and 2, which are shown in two sections having their midpoint connected with the branch circuit 5, are each connected with the line $L_1$ and with the balancing network $AL_1$. The third winding 3 is connected with the output of the amplifier 6 which may be of any well known type but is preferably a vacuum tube. The fourth winding 4 of the coil $T_1$ is connected with the tip contacts of the double jack $J_1$. Since hybrid coils are so well known to those skilled in the art of telephone repeaters, it will suffice to say that when the artificial line $AL_1$ balances the line $L_1$, energy from the amplifier 6, impressed inductively upon the windings of 1 and 2 by the winding 3, will cause a flow of current over the line $L_1$ and also through the artificial line $AL_1$, and since the currents are equal no difference of potential exists across the circuit 5, and therefore singing is not produced. The output of the amplifier 7 is connected across the winding 10 of the hybrid coil $T_2$, of which the line windings 8 and 9 are each connected with the line $L_2$ and the artificial line $AL_2$. The fourth winding 11 of this coil is connected with the double jack J, one of the conductors being connected with the tip contact of one jack and the other conductor with the sleeves of both the jacks. The midpoints of the windings 8 and 9 are connected by the circuit 12 with the input of the amplifier 6.

The measuring circuit, which is in the nature of a one-way amplifier, is shown in the lower part of the drawing, terminating at its input end in a double jack $J_2$, and having clips at its output end which are designed to engage lugs to which the conductors of circuits 5 and 12 are soldered at some point thereon. The input side of the testing circuit is connected with the repeater circuit by a three-conductor patching cord, two of which conductors connect the tip contacts of the double jack $J_1$ with the tip contacts of the double jack $J_2$, and the third conductor the sleeve contacts of the jacks. When the clips 13 are placed upon the lugs 14 of circuit 5, the testing circuit is arranged to measure the balance between the line $L_1$ and the artificial line $AL_1$. If the clips were placed upon the lugs 15 of circuit 12 the testing apparatus would then measure the balance between the line $L_2$ and its associated artificial line. In measuring the balance between the line and its artificial line it is desirable to have the line terminate at a distant point in an inoperative repeater, which simulates electrically the repeater, shown in the drawing. Such a repeater termination is represented by 16 in the drawing.

One of the tip contacts, and the sleeve contacts of the double jack $J_2$ are connected with the upper and lower contacts, respectively, of the double-throw single-pole switch 17. The movable contact or blade of the switch 17 is connected with one of the outer contacts of a double-pole double-throw switch 18, and the other tip contact of the double jack $J_2$ is connected with the other similar outer contact of the switch 18. These outer contacts are connected with the opposite contacts in order to effect a reversal. The movable contacts of the switch 18 are connected across a potentiometer 19, which in turn is connected with the primary of the transformer 20. The secondary of this transformer is connected with the first stage of a two-stage amplifier the output of the first stage of which is coupled by the transformer 21 with the second stage thereof. The output circuit of the second stage, which includes the primary of the transformer 22, is arranged to include a filter by means of which the frequency of the oscillations, which are transmitted around the circuit for the purpose of measuring the balance, may be limited to a definite range. Two of these filters, designated $F_1$ and $F_2$, are shown in the drawing, but it is to be understood that the number may be greater or less. These filters may be connected with the output circuit of the amplifier by means of the switches 23 and 24. The secondary winding of transformer 22 is connected with a telephone receiver 25, shunted by the resistance 27, by means of which the oscillating condition is indicated. This winding is also connected across the network 26 which is proportioned to furnish an impedance suitable for terminating the filters $F_1$ and $F_2$.

The manner in which the invention is operated in order to measure balance is as follows: Assuming that the patching cord has been inserted in the double jacks $J_1$ and $J_2$ and that the clips 13 have been snapped on to the lugs 14, the switch 17 is thrown upwardly and the switch 18 is left in either position. Switches 23 and 24 may be thrown upwardly to connect into the output circuit of the amplifier the filter $F_1$, which will be assumed to transmit a range of frequencies, say, from 200 to 600 cycles. For the purpose of calibrating the measuring arrangement a short circuit will be applied to the terminals of windings 1 and 2, which are connected to the line $L_1$, thus creating a condition that represents the maximum unbalance. The potentiometers of the amplifiers 6 and 7 are turned down to prevent singing through them. With the circuit thus arranged, the potentiometer 19 will be varied until the gain of the amplifier equals the loss through the hybrid coil $T_1$, whereupon singing will begin, which will be manifested by the receiver 25. In order to get a clear understanding of the nature of this invention, it is desirable to point out that the current in the output circuit of the second stage of the amplifier, if of a frequency tranmittable through the filter $F_1$, produces a voltage across the secondary of transformer 22 and likewise across the network 26, which voltage causes current to flow through the windings 1 and 2 and through the artificial line $AL_1$. If the artificial line exactly or substantially balanced the line $L_1$, these currents would of course be equal, and since they flow in opposite directions through the respective halves of the windings 1 and 2, their net inductive effect upon the winding 4 would be nil. There would, in consequence, be no voltage impressed across the potentiometer, and consequently singing would not occur. Singing results from an unbalance between the line $L_1$ and its artificial line which, due to the inequality in the currents flowing through the respective branches, causes a resultant current to be set up in the circuit connected with the winding 4. This current is impressed upon the amplifier, and when the potentiometer is adjusted so that the gain produced by the amplifier is greater than the loss through the coil $T_1$, an oscillating condition will be created which is evidenced by the receiver 25. As stated above, the line terminals of the windings 1 and 2 are short-circuited. The position of the potentiometer, when singing begins, is noted. The short circuit across the terminals of windings 1 and 2 is then removed, thus effectively reconnecting the line to the hybrid coil $T_1$. Then the potentiometer 19 is varied until oscillations are produced and the positions noted. Similarly, with the switches 23 and 24 in their lower positions, the apparatus can be calibrated and measurements made in the frequency range of the filter $F_2$. Since the potentiometer has previously been calibrated for known degrees of balance, the balance between the line $L_1$ and its artificial line $AL_1$ may readily be determined by the difference between the settings of the potentiometer.

The balance between the line $L_2$ and its artificial line may be determined by throwing switch 17 downwardly and connecting the clips 13 to the lugs 15 in the input circuit 12, and proceeding in the same way as described above.

When the circuit begins to sing for a given setting of the potentiometer, the switch 18 is thrown to its opposite contacts, thereby reversing the connection of the input circuit of the amplifier. The potentiometer is then adjusted to oscillate under this condition, and the lowest gain for the two positions of the reversing switch indicates the balance that exists for the frequencies represented by the filter connected with the output circuit of the amplifier at this time.

While the invention has been described as embodied in a particular form, it is capable of embodiment in other forms without departing from the spirit and scope of the appended claims.

What is claimed is:

1. In a system for measuring balance between two electrical networks, the combination with a hybrid coil of two networks whose unbalance is to be determined, each connected with a terminal of each of two windings of the said coil, a circuit connected across the midpoints of the said two windings, a second circuit connected with a third winding of the said hybrid coil, a fourth winding, a one-way repeater having its input circuit connected with the said fourth winding with a potentiometer connected therein, the said repeater having its output connected across the circuit connected with the mid-points of the said first-mentioned two windings, and a receiver connected with the said output circuit to indicate the presence of oscillations in the said circuit.

2. In a system for measuring balance between two electrical networks, the combination with a hybrid coil having a plurality of windings, of two electrical networks each connected with a terminal of each of two of said windings, a circuit connected with the midpoints of the said two windings, a third winding, a fourth winding connected with the input of a one-way repeater having means to control the potential applied thereto, the said repeater having its output effectively connected with the midpoints of the said first-mentioned two windings, the said output circuit having means to indicate the presence of oscillations therein, and a filter to determine the frequency of the oscillations transmitted thereover.

3. In a system for measuring balance between two electrical networks, the combination with a transmission measuring device of a repeater having hybrid coils connected therewith, a plurality of lines and balancing networks connected with the said repeater through the said hybrid coils, and means for connecting the said measuring device to the bridge terminals of a hybrid coil and also to one winding thereof.

4. In a system for measuring balance between two electrical networks, the combination with an amplifier of a repeater having hybrid coils connected therewith, a plurality of lines and balancing networks connected with the said repeater through the said hybrid coils, and means for connecting the said amplifier to the bridge terminals of a hybrid coil and also to one winding thereof.

5. In a system for measuring balance between two electrical networks, the combination with a repeater of a plurality of hybrid coils, a plurality of lines and networks connected with the said repeater through the said hybrid coils, an amplifier, means to connect the said amplifier to the bridge terminals of a hybrid coil and also to one winding thereof, means to adjust the gain of the said amplifier and means to detect the occurrence of singing.

6. In a system for measuring balance between two electrical networks, the combination with a repeater of a plurality of hybrid coils, a plurality of lines and networks connected with the said repeater through the said hybrid coils, an amplifier, means to connect the said amplifier to the bridge terminals of a hybrid coil and also to one winding thereof, means to adjust the gain of the said amplifier, means to detect the occurrence of singing and a filter adapted to transmit a predetermined frequency or band of frequencies.

7. In a system for measuring balance between two electrical networks, the combination with a repeater of a plurality of hybrid coils, a plurality of lines and networks connected with the said repeater through the said hybrid coils, an amplifier, means to connect the said amplifier to the bridge terminals of a hybrid coil and also to one winding thereof, means to adjust the gain of the said amplifier, means to detect the occurrence of singing, a plurality of filters each adapted to transmit a predetermined frequency or band of frequencies and means for selecting a desired filter.

8. In a system for measuring balance between two electrical networks, the combination with a repeater of a plurality of hybrid coils, a plurality of lines and balancing networks connected with the said repeater through the said hybrid coils, means to connect the said amplifier to the bridge terminals of a hybrid coil and also to one winding thereof, means to adjust the gain of the amplifier, means to detect the occurrence of singing and means for reversing the poling of the said amplifier.

9. In a system for measuring balance between two electrical networks, the combination with a hybrid coil of a plurality of impedances connected with certain windings of the said coil, a measuring circuit having one end connected with the midpoints of the said certain windings and the other end connected with another winding of the said coil, the said circuit having an amplifier, means to adjust the gain of the said amplifier, and means to detect the occurrence of singing.

10. In a system for measuring balance between two electrical networks, the combination with a hybrid coil of a plurality of impedances connected with certain windings of the said coil, a measuring circuit having one end connected with the midpoints of the said certain windings and the other end connected with another winding of the said coil, the said circuit having an amplifier, means to adjust the gain of the said amplifier, means to detect the occurrence of singing, a plurality of filters each adapted to transmit a predetermined frequency or band of frequencies, and means for selecting a desired filter.

11. In a system for measuring balance between two electrical networks, the combination with a Wheatstone bridge network of an impedance balance measuring circuit, the said network comprising one winding of a transformer, an impedance connected with one end of the said winding, a second impedance connected with the other end of the said winding, the said winding and said impedances forming a closed network, the said measuring circuit having its input and its output ends conjugately connected with the said network, the said circuit including an amplifier, means to adjust the gain of the said amplifier, and means to detect the occurrence of singing.

12. In a system for measuring balance between two electrical networks, the combination with a Wheatstone bridge network of an impedance balance measuring circuit, the said network comprising one winding of a transformer, an impedance connected with one end of the said winding, a second impedance connected with the other end of the said winding, the said winding and said impedances forming a closed network, the said measuring circuit having its input and its output ends conjugately connected with the said network, the said circuit including an amplifier, means to adjust the gain of the said amplifier, means to detect the occurrence of singing, a plurality of frequency selecting circuits each adapted to transmit a predetermined frequency or band of frequencies, and means for effectively connecting any of said frequency selecting circuits with the said measuring circuit.

In testimony whereof, I have signed my name to this specification this 24th day of February, 1927.

SUMNER B. WRIGHT.